(12) United States Patent
Gioia et al.

(10) Patent No.: US 6,971,692 B2
(45) Date of Patent: Dec. 6, 2005

(54) PROTECTIVE STRUCTURE FOR VEHICLES SUITABLE FOR BEING USED, IN PARTICULAR, IN THE CASE OF COLLISION WITH PEDESTRIANS

(75) Inventors: Pasquale Gioia, Pordenone (IT); Marco Luga Righini, Pordenone (IT); Mario Vismara, Milan (IT); Alessandro Riva, Milan (IT); Jean Louis Toneatti, Milan (IT)

(73) Assignees: ADLEV S.r.l., Milan (IT); Plastal S.p.A, Pordenone (IT)

( * ) Notice: Subject to any disclaimer, the term of this patent is extended or adjusted under 35 U.S.C. 154(b) by 0 days.

(21) Appl. No.: 10/889,455

(22) Filed: Jul. 12, 2004

(65) Prior Publication Data

US 2005/0052036 A1    Mar. 10, 2005

(30) Foreign Application Priority Data

Jul. 10, 2003  (IT) ............................ MI2003A1411

(51) Int. Cl.[7] ........................ B60R 19/12; B60R 19/18; B60R 21/34
(52) U.S. Cl. ........................ 293/120; 293/102; 293/15; 293/146; 296/187.04
(58) Field of Search ................ 293/102, 107, 293/109, 15, 120, 121, 146; 296/187.04

(56) References Cited

U.S. PATENT DOCUMENTS

| | | | |
|---|---|---|---|
| 6,467,822 B1 * | 10/2002 | Leng | 293/121 |
| 6,659,520 B2 * | 12/2003 | Bastien et al. | 293/120 |
| 6,676,179 B2 * | 1/2004 | Sato et al. | 293/115 |
| 2001/0026072 A1 * | 10/2001 | Sato et al. | 293/115 |
| 2003/0067178 A1 * | 4/2003 | Bastien et al. | 293/120 |
| 2003/0067179 A1 * | 4/2003 | Bastien et al. | 293/120 |
| 2004/0160071 A1 * | 8/2004 | Suganuma et al. | 293/132 |

FOREIGN PATENT DOCUMENTS

| | | | | |
|---|---|---|---|---|
| DE | 22 16 324 | | 10/1973 | |
| EP | 1300296 A2 * | | 4/2003 | ........... B60R 19/22 |
| EP | 1 314 614 | | 5/2003 | |
| FR | 2 445 783 | | 8/1980 | |
| JP | 2002-274298 | | 9/2002 | |
| JP | 2004196004 A * | | 7/2004 | ........... B60R 19/48 |

OTHER PUBLICATIONS

EPO Search Report.

* cited by examiner

*Primary Examiner*—Patricia L. Engle
(74) *Attorney, Agent, or Firm*—Hedman & Costigan, P.C.

(57) ABSTRACT

Protective structure for vehicles, suitable for being used, in particular, in the case of collision between a vehicle and a pedestrian, of the type comprising at least a bumper strip (2), for the protection of the vehicle, comprising a lower portion (21) and an upper portion (22). The upper portion protrudes outwards with respect to the lower portion and comprises a buffer (T). The structure also comprises at least one reinforcement (3) situated inside said lower portion of the bumper strip.

5 Claims, 3 Drawing Sheets

PROTECTIVE STRUCTURE FOR VEHICLES SUITABLE FOR BEING USED, IN PARTICULAR, IN THE CASE OF COLLISION WITH PEDESTRIANS

The present invention relates to a protective structure for vehicles, suitable for being used, in particular, in the case of collision with pedestrians.

Recent regulation proposals with respect to collision in the automobile sector, envisage increasingly strict limits, above all in the case of collision between vehicles and pedestrians (so-called pedestrian collision).

Numerous absorbing systems have been studied in this respect to overcome these limits without modifying the other performances during the collision.

In particular, the conditions proposed by current provisions for 2010 envisage that, at a medium-low speed of the vehicle (about 40 K m/h), the maximum rotation of the leg in the case of collision should be less than or equal to 15°, whereas the maximum shifting value between the thigh bone and tibia must be less than or equal to 6 mm; a further maximum limit is envisaged, on the other hand, (less than or equal to 150 g, wherein g represents the acceleration due to gravity, equal to approximately 9.81 m/s$^2$) relating to the acceleration values in correspondence with the tibia.

Experimental measurements effected, starting from data relating to the average mass of a thigh bone and a tibia and at the speed of a vehicle during collision, result in a final energy balance, which is such that, according to the aesthetic style of the car bodywork, the completion of the collision is ideally defined when the initial energy of the leg is converted into work between its movements (shearing stress work, work due to the rotation moment and deformation work due to the crushing of the absorption devices).

From this, and from the limits on the rotation movements and shear imposed by the provisions, it has been found that 90% of the energy is absorbed by the deformation work and, for this reason, it is necessary to use, inside the car bumper strip, at least one energy absorbing device or buffer inserted between the strip and the front crossbeam of the car. The buffers are made for example of expanded polypropylene or expanded polyurethane.

When the space between the bumper strip and crossbeam of the car is greater then 120 mm, using a buffer having these dimensions and a soft material, the crushing of the buffer itself during the collision absorbs the energy necessary for respecting the above conditions imposed by law provisions.

When the space in the vehicle (for example less than 120 mm) is not sufficient for inserting a buffer having these characteristics, it is necessary to stiffen the buffer, as the energy absorbed is provided by the average strength of the buffer (rigidity) for the crushing allowed. If the crushing is reduced, in order to obtain equal absorption conditions, it is necessary to increase the average strength i.e. stiffen the buffer.

A stiffening of the buffer causes an increase in the rotation of the leg during collision. To avoid this problem, reinforcements are used in the lower part of the bumper strip, normally inserted in an area having a height from the ground ranging from 150 to 350 mm. These reinforcements are normally constrained to a resistant part of the vehicle, for example to the engine chassis or on the front end and are made of metal or moulded plastic which is fixed with conventional hooks both to the bumper strip and to the vehicle.

The Applicant has observed that these reinforcements increase the overall weight of the vehicle and the production costs of the vehicle itself, as they must be manufactured separately and subsequently assembled between the vehicle and bumper strip. This requires, in addition to the cost of the item, an extra assembly phase of the vehicle, thus increasing the overall production costs and time of the vehicle.

An objective of the present invention is therefore to eliminate the disadvantages reported, by providing a high efficiency protective structure for vehicles, suitable for being used particularly in the case of collision with pedestrians, which firstly allows the requisites imposed by the provisions in force, with respect to collisions between a vehicle and a pedestrian, at medium-low speeds, to be satisfied, without modifying the aesthetic profile, exterior style and performances of the vehicle relating to other types of collision.

For this purpose, the Applicant has produced a protective structure for vehicles, which can be fixed to the vehicle, wherein at least one reinforcing device is directly positioned on the bumper strip and to which it is attached, for example by means of adhesives, welding or mechanical fixing. The structure allows the stiffness of the part that contacts the pedestrians leg to be considerably increased, thus geometrically limiting the rotations caused and at the same time envisaging reduced dimensions of the buffers used.

An aspect of the present invention relates to a protective structure for vehicles, suitable for being used, in particular, in the case of collision between a vehicle and a pedestrian, of the type comprising at least a bumper strip, for the protection of the vehicle, comprising a lower portion and an upper portion, the upper portion protruding outwards with respect to the lower portion and comprising a buffer, characterized in that it comprises a reinforcement situated inside the lower portion of the bumper strip.

The characteristics and advantages of the protective structure for vehicles according to the present invention will appear more evident from the following illustrative and non-limiting description, referring to the enclosed schematic drawings, in which:

FIG. 1b is a section of the bumper strip of FIG. 1a;

Figure 1A:
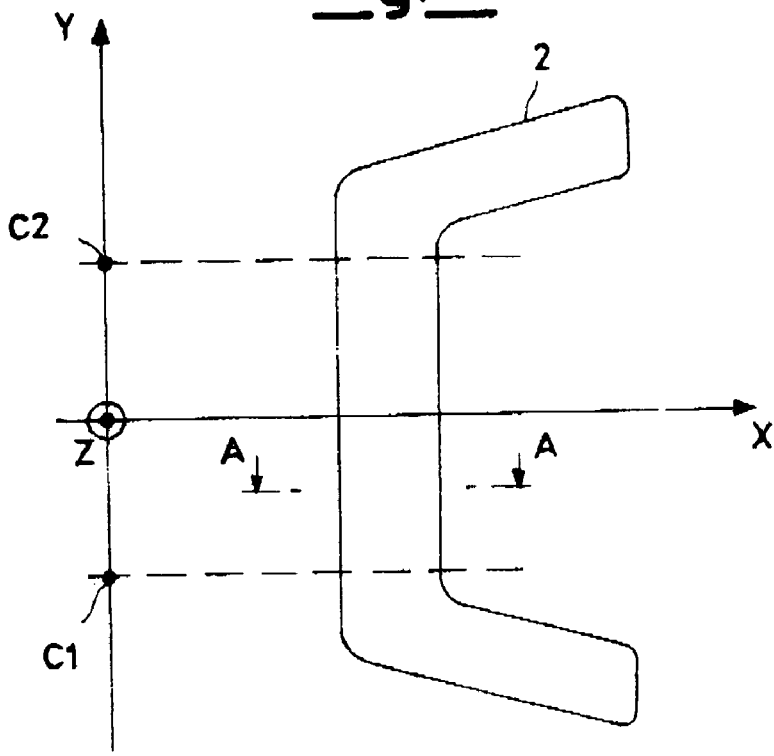
FIG. 1a is a schematic view from above of a conventional bumper strip.
Figure 1B:
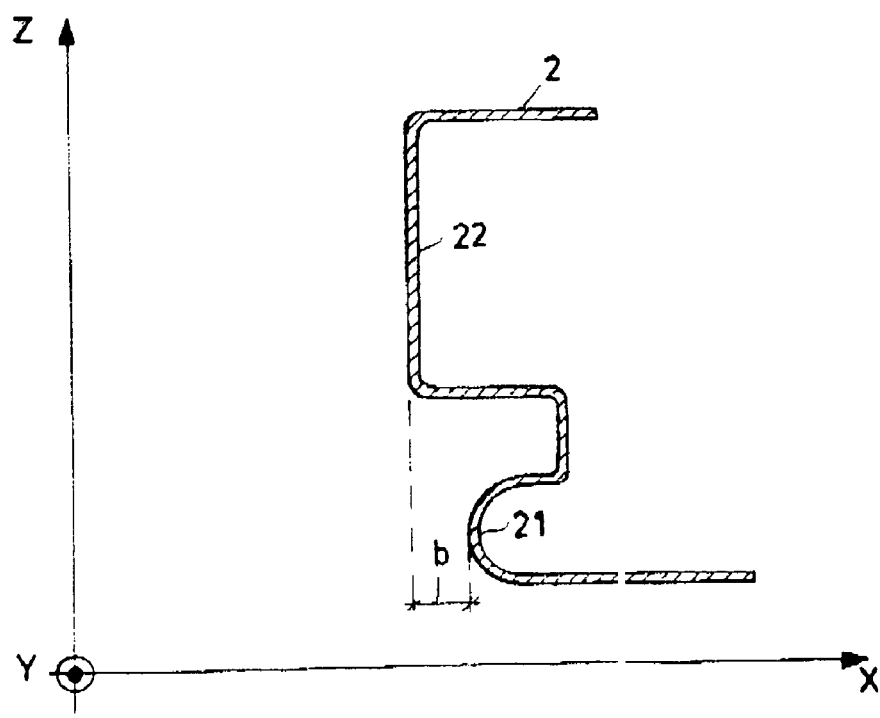
Figure 2:
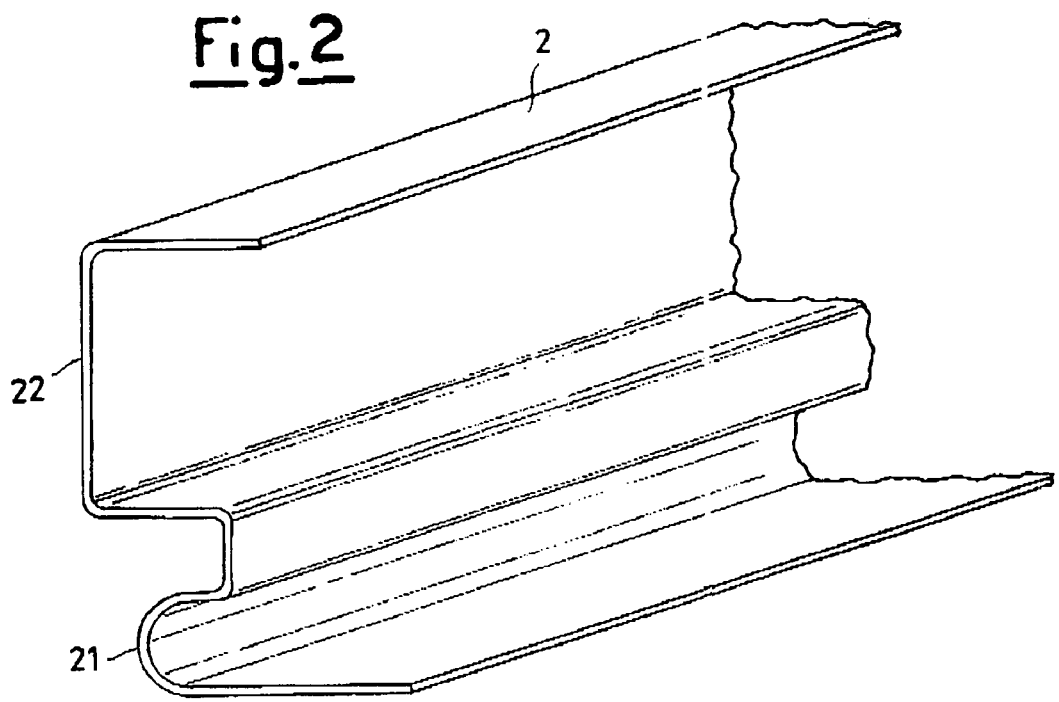
FIG. 2 is a perspective view of the bumper of FIG. 1.

FIGS. 1a, 1b and 2 illustrate a conventional bumper strip 2 which comprises, with respect to the reference identified by the ground, a lower portion 21 and an upper portion 22.

Furthermore, y represents the direction of the width (transversal) of the bumper strip, b is the distance in a longitudinal direction between the most protruding part of the bumper in the upper portion and between the most protruding part in its lower portion.

The lower portion 22 is generally positioned at a distance ranging from about 150 mm to 350 mm from the ground in a standard car; the upper portion is considered as being included in an area at a distance from the ground ranging from about 450 mm to 500 mm.

The parameters, moreover, are considered within a central portion of the bumper in a transversal direction (direction y in FIG. 1a). The central position has a width of about 800 mm (marked in FIG. 1a by the dashed lines indicated with C1 and C2).

In order to verify the correct functioning characteristics, a bumper strip of this type is subjected to an impact test with a cylindrical impact device having a diameter of 138 mm and a weight of 33.8 kg.

The test consists of fixing the bumper strip in a position similar to that of normal use and attached to a support by means of its conventional fixing points to the vehicle, and subjecting the bumper to impact with the cylindrical impact device in its lower portion 21. The impact device travels at a speed of 40 km/h. During the test a strength curve, expressed in Newtons, is obtained, created by the bumper strip in relation to the advancing of the cylinder.

To satisfy this test, the strength created by the bumper strip must range from approximately 3,000 N to 10,000 N.

The aim of the present invention is to provide a protective structure which respects this requisite, in which a buffer T positioned in the upper portion has a width (direction x of FIG. 1a) of less than 120 mm and a distance in a longitudinal direction b between the most protruding part of the bumper in the upper portion and between its most protruding part in the portion of less than 50 mm in at least one point (at a y ranging from c1 to c2).

Figure 3A:
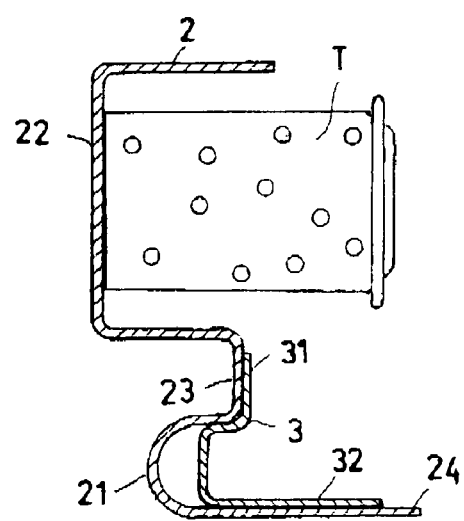
FIG. 3a is a cross-section of the protective structure according to an embodiment of the present invention.
Figure 3B:
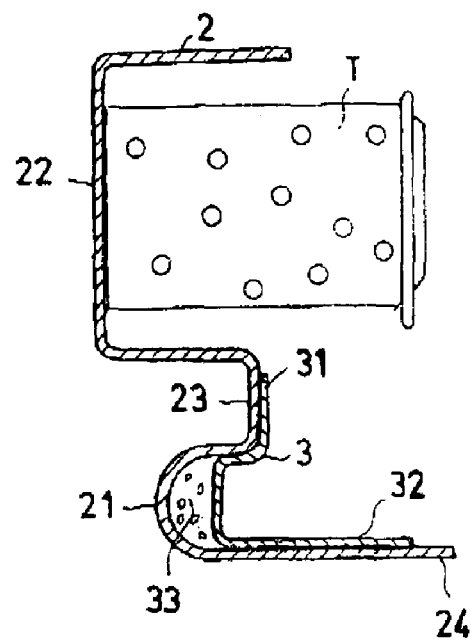
FIG. 3b is a cross-section of the protective structure according to a further embodiment of the present invention.

According to the present invention, with reference to FIGS. 3a and 3b, the protective structure comprises the bumper strip 2 and a reinforcement 3, positioned in its lower portion 21 inside the bumper strip. Furthermore, the buffer or absorbing element T is partly situated in the upper portion of the bumper strip.

The reinforcement 3 is fixed at its upper end 31 to the strip in an intermediate area 23 of the strip, the strip itself being positioned between the lower portion and upper portion. The reinforcement is fixed at its lower end 32 to an end portion 24 of the lower portion of the bumper strip. Furthermore, the reinforcement substantially at least partially copies the internal profile of the bumper strip in the lower area.

The fixing can be obtained by means of welding if the material used for the reinforcement is the same material used for the bumper strip, or by means of adhesives or mechanical fixing devices (screws, rivets, etc.) if a different material is used than that adopted for the bumper strip.

The length of the reinforcement, in its lower portion 32, can be less than the lower end portion 24 of the bumper strip; in this case, fixing means of the protective structure to the vehicle are effected on the lower end portion 24 of the bumper strip.

Alternatively, the length of the reinforcement in its lower portion 32, can be greater than the lower end portion 24 of the bumper strip; in this case, the fixing means of the protective structure to the vehicle are effected on the lower portion 32 of the reinforcement.

Furthermore, in a central portion of the reinforcement 33, in particular in the space created between the bumper strip and reinforcement in the portion, reinforcing ribs or a further absorbing element or rigid material can be inserted, so that during the above test with the impact device, the advancing of the impact device into the bumper strip is reduced.

Figure 4:
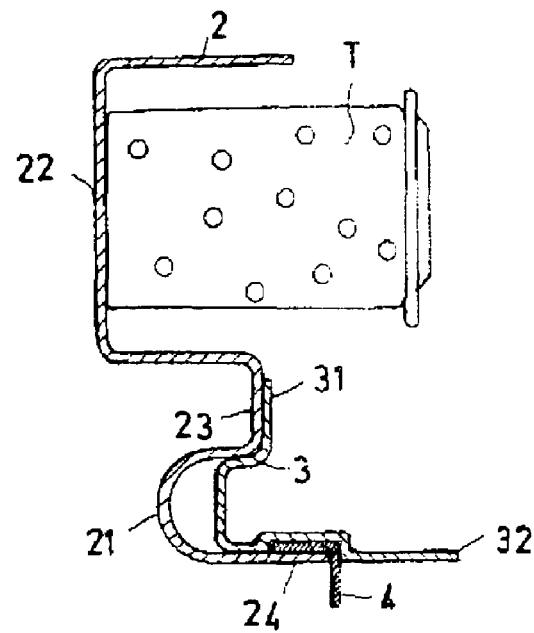
FIG. 4 is a cross-section of the protective structure according to the present invention integrating a DEM (aerodynamic deflector).

FIG. 4 illustrate a further embodiment of the present invention, in which the protective structure comprises an aerodynamic deflector (DEM) 4 positioned in the lower end portion of the bumper strip 24, inserted between this and the reinforcement 3.

The aerodynamic deflector is substantially L-shaped and its vertical portion protrudes from the lower end portion of the bumper strip substantially in the direction of the ground. The deflector is produced, for example, by means of an extruded product made of rubber or moulded plastic and its function is to improve the aerodynamic coefficient (known as Cx) of the car.

In this case, the length of the reinforcement in its lower portion 32 is greater than that of the lower end portion 24 of the bumper strip; the fixing means of the protective structure to the vehicle are therefore effected on the lower portion 32 of the reinforcement. The aerodynamic deflector has a width (direction y of FIG. 1a) which is substantially similar to that of the bumper strip, and is fixed between the bumper strip and reinforcement during = the assembly phase of the protective structure (by means of welding, adhesives, or mechanical fixing devices).

What is claimed is:

1. A protective structure for vehicles, suitable for being used in the case of collision between a vehicle and a pedestrian, of the type comprising at least a bumper strip (2), for the protection of the vehicle, comprising a lower portion (21) and an upper portion (22), said upper portion protruding outwards with respect to said lower portion and comprising a buffer (T), characterized in that it comprises at least one reinforcement (3) situated inside said lower portion of the bumper strip, said reinforcement being fixed at its upper end (31) in an intermediate area (23) of the bumper strip positioned between said lower portion and said upper portion, and the reinforcement is fixed at its lower end (32) in an end portion (24) of said lower portion of the bumper strip.

2. The protective structure for vehicles according to claim 1, further comprising an aerodynamic deflector (4) inserted between the lower end portion of the bumper strip (24) and the reinforcement (3).

3. The protective structure for vehicles according to claim 2, wherein said aerodynamic deflector is substantially L-shaped and has a vertical portion protruding from the lower end portion of the bumper strip substantially in the direction of the ground.

4. The protective structure for vehicles according to claim 1, wherein the length of the lower portion (32) of the reinforcement is less than the lower end portion (24) of the bumper strip, which on the lower end portion (24) comprises fixing means of the protective structure to the vehicle.

5. The protective structure for vehicles according to claim 1, wherein the length of the lower portion (32) of the reinforcement is greater than the lower end portion (24) of the bumper strip, said lower portion (32) of the reinforcement comprising fixing means of the protective structure to the vehicle.

* * * * *